(12) United States Patent
Sansom et al.

(10) Patent No.: US 8,300,232 B2
(45) Date of Patent: Oct. 30, 2012

(54) METHOD OF MEASURING COATING THICKNESS USING INFRARED LIGHT

(75) Inventors: David G. Sansom, Chuluota, FL (US); David B. Allen, Oviedo, FL (US); Anirudha Vaidya, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 578 days.

(21) Appl. No.: 12/543,674

(22) Filed: Aug. 19, 2009

(65) Prior Publication Data
US 2011/0043820 A1   Feb. 24, 2011

(51) Int. Cl.
*G01B 9/02* (2006.01)
*G01B 11/02* (2006.01)
*G01B 11/28* (2006.01)

(52) U.S. Cl. .................. 356/485; 356/503; 356/630

(58) Field of Classification Search .................. 356/485, 356/503, 504, 630, 632; 250/559.27
See application file for complete search history.

(56) References Cited

U.S. PATENT DOCUMENTS

| | | | |
|---|---|---|---|
| 3,591,293 A * | 7/1971 | Maltby et al. | 356/5.01 |
| 4,611,919 A * | 9/1986 | Brooks et al. | 356/504 |
| 4,634,291 A | 1/1987 | Bantel et al. | |
| 5,355,083 A | 10/1994 | George et al. | |
| 5,500,649 A * | 3/1996 | Mowrey et al. | 342/22 |
| 5,754,294 A * | 5/1998 | Jones et al. | 356/503 |
| 6,534,975 B2 | 3/2003 | Beeck et al. | |
| 7,233,401 B1 | 6/2007 | Houser | |
| 2007/0109551 A1 * | 5/2007 | Aiyer | 356/485 |

* cited by examiner

*Primary Examiner* — Michael A Lyons

(57) ABSTRACT

A method of measuring a thickness of a coating on a substrate material. A first pulse of monochromatic light having a predetermined first wavelength is emitted toward the coating and substrate material. A second pulse of monochromatic light having a predetermined second wavelength is emitted toward the coating and substrate material, the second wavelength being different than the first wavelength. A first elapsed time is measured from emission of the first pulse of light to reception of a reflection of the first pulse of light from a surface of the substrate material at an interface with the coating. A second elapsed time is measured from emission of the second pulse of light to reception of a reflection of the second pulse of light from an outer surface of the coating. A thickness of the coating is determined as a function of a difference between the first and second elapsed times.

20 Claims, 2 Drawing Sheets

METHOD OF MEASURING COATING THICKNESS USING INFRARED LIGHT

FIELD OF THE INVENTION

The present invention relates to the measurement of the thickness of a coating and, more particularly, to the measurement of the thickness of a thermal barrier coating on a metal substrate.

BACKGROUND OF THE INVENTION

Metallic components, such as turbine blades in a gas turbine engine, commonly include a thermal barrier coating which protects the components from hot gases present in the engine. The thermal barrier coating is typically thin, i.e., on the order of 5 to 9 thousandths of an inch. The barrier coating is typically formed as a ceramic-like material having a low heat transfer coefficient and having a high melting point. For example, yttria stabilized zirconia is often used as a thermal barrier protective coating on gas turbine hot section components. The coating is typically applied by either thermal spray or vapor phase techniques. The thickness of the coating is used to control the temperature gradient developed between the surface of the component and the base material to which the coating is applied.

Due to process variations, it is difficult to determine the thickness of a coating applied to complex geometry components on a part to part basis. Generally, destructive evaluation is used to evaluate the coating thickness during an initial set-up of the coating process, followed by a combination of non-destructive measurement and sacrificial test pieces used for ongoing process control of the coating thickness. For example, eddy current thickness measurement is a widely used non-destructive in-process control tool to verify the thermal barrier coating thickness. However, an issue associated existing non-destructive methods, such as eddy current testing, is that it is difficult to define the location of the interface between the coating and the base material, especially in highly curved areas of the component, or where the base material is porous or includes significant defects.

Infrared flash tomography is often used with thermal barrier coatings to identify areas of delamination, spalling or defects that may occur in the coating or at the interface between the coating and the base material. Infrared tomography heats the thermal barrier coating at a known rate and measures the reflected heat signature emitted from the test piece, where it is believed that a measurement of the heat decay with time can provide a value indicative of the coating thickness. In addition, mid-infrared reflectance has been used to inspect the health of a thermal barrier coating using changes or variations of the reflectance of light from the coating, as determined relative to a known standard, to determine a level of internal damage to the coating layer. Optical coherence tomography has also been applied as a method of determining the coating thickness, but requires calibration of the system against reference samples having a known thickness.

There continues to be a need to provide a non-destructive inspection method for determining the thickness of a thermal barrier coating that may be implemented during a manufacturing process for applying the coating, as well as at other times such as during routine inspection of components.

SUMMARY OF THE INVENTION

In accordance with one aspect of the present invention, a method of measuring a thickness of a coating on a substrate material is provided. The method comprises: emitting a first pulse of monochromatic light having a predetermined first wavelength toward the coating and substrate material; emitting a second pulse of monochromatic light having a predetermined second wavelength toward the coating and substrate material, the second wavelength being different than the first wavelength; measuring a first elapsed time from emission of the first pulse of light to reception of a reflection of the first pulse of light from a surface of the substrate material at an interface with the coating; measuring a second elapsed time from emission of the second pulse of light to reception of a reflection of the second pulse of light from an outer surface of the coating; and determining a thickness of the coating as a function of a difference between the first and second elapsed times.

The first and second wavelengths may comprise two different wavelengths of coherent infrared laser light.

The first wavelength may comprise a shorter wavelength than the second wavelength.

The coating may comprise a thermal barrier coating and the substrate material may comprise a metal substrate, where the thermal barrier coating is transmissive to the first wavelength and is reflective of the second wavelength.

The thermal barrier coating may comprise 8 wt % yttria stabilized zirconia and the substrate material may comprise a superalloy comprised substantially of nickel or cobalt.

The first wavelength may be approximately 4 µm and the second wavelength may be equal to or greater than approximately 10 µm.

The coating may comprise an environment barrier coating and the substrate material may comprise a ceramic substrate, where the environmental barrier coating is transmissive to the first wavelength and is reflective of the second wavelength.

The step of determining the thickness of the coating may comprise determining a thickness, T, equal to:

$$T = f_1 \lambda_1 t_s - f_2 \lambda_2 t_c$$

where:
$f_1$=frequency of the first pulse of light
$\lambda_1$=wavelength of the first pulse of light
$t_s$=elapsed time of the first pulse of light reflected from substrate
$f_2$=frequency of the second pulse of light
$\lambda_2$=wavelength of the second pulse of light
$t_c$=elapsed time of the second pulse of light reflected from coating.

In accordance with another aspect of the invention, a method of measuring a thickness of a thermal barrier coating on a metal substrate is provided. The method comprises: emitting a first pulse of coherent light from a first laser toward the thermal barrier coating and the metal substrate, the first pulse of light having a predetermined first wavelength; emitting a second pulse of coherent light from a second laser toward the thermal barrier coating and the metal substrate, the second pulse of light having a predetermined second wavelength different than the first wavelength; measuring a first elapsed time from emission of the first pulse of light to reception of a reflection of the first pulse of light at a first detector from a surface of the metal substrate at an interface with the thermal barrier coating; measuring a second elapsed time from emission of the second pulse of light to reception of a reflection of the second pulse of light at a second detector from an outer surface of the thermal barrier coating; and determining a thickness of the thermal barrier coating as a function of a difference between the first and second elapsed times.

In accordance with a further aspect of the invention, a method is provided for measuring a thickness on a structure comprising a thermal barrier coating on a metal substrate. The method comprises: providing a structure comprising a metal substrate comprised substantially of nickel or cobalt and a thermal barrier coating on the metal substrate comprising 8 wt % yttria stabilized zirconia; emitting a first pulse of coherent light from a laser toward the thermal barrier coating and the metal substrate, the first pulse of light having a predetermined first wavelength and the thermal barrier being transmissive to the first wavelength; emitting a second pulse of coherent light from a laser toward the thermal barrier coating and the metal substrate, the second pulse of light having a predetermined second wavelength different than the first wavelength and the thermal barrier coating being reflective of the second wavelength; measuring a first elapsed time from emission of the first pulse of light to reception of a reflection of the first pulse of light from a surface of the metal substrate at an interface with the thermal barrier coating; measuring a second elapsed time from emission of the second pulse of light to reception of a reflection of the second pulse of light from an outer surface of the thermal barrier coating; and determining a thickness of the thermal barrier coating as a function of a difference between the first and second elapsed times.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
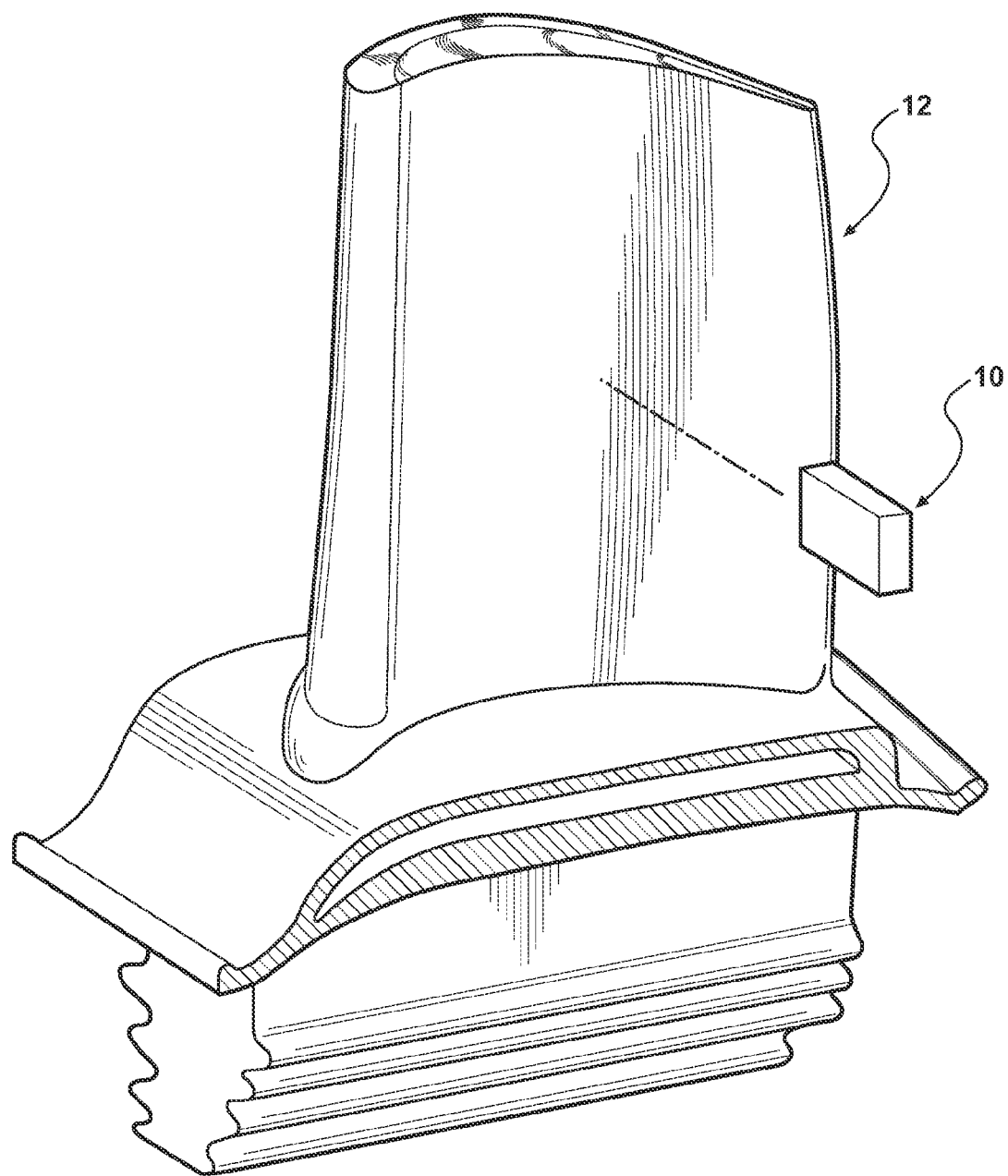
FIG. 1 illustrates an embodiment of the method of the invention performed on a component structure comprising a turbine blade.

FIG. 1 illustrates one form of the present invention, including a light emission/receptor unit 10 provided in accordance with the present invention. The emission/receptor unit 10 is located in close proximity to a component structure 12, illustrated herein as a turbine engine blade, having a coating defining a thickness to be measured. It should be understood that, although the present method is described with reference to the illustrated turbine engine blade, other components provided with a coating as described herein may be implemented in the present invention.

Figure 2:
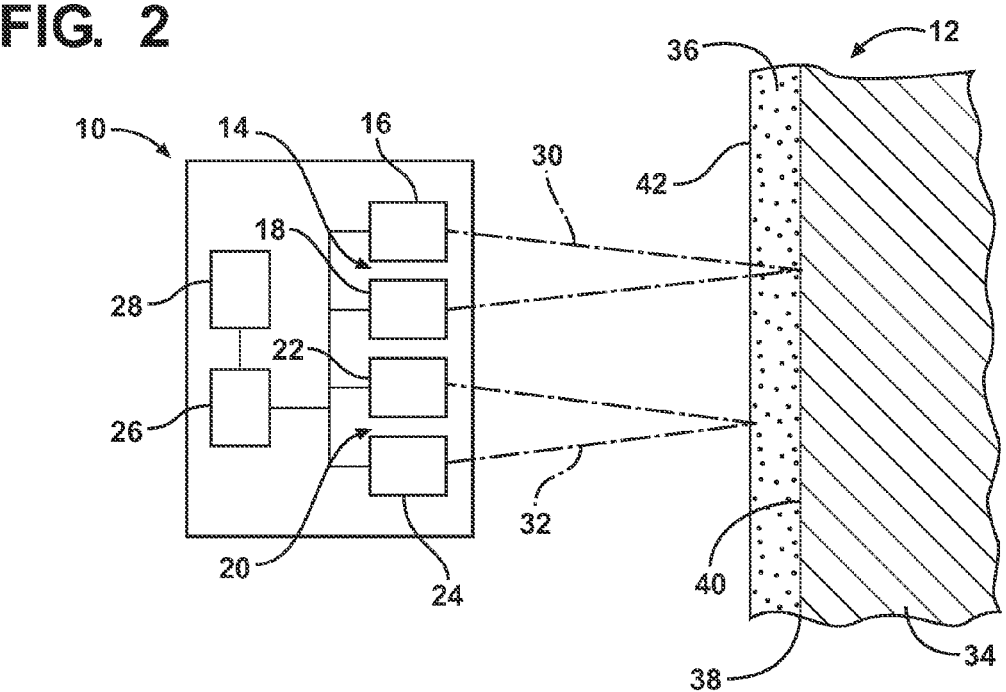
FIG. 2 is a diagrammatic view illustrating details of an emission/receptor unit and the component structure having a coating located on a substrate material.

Referring to FIG. 2, the emission/receptor unit 10 is illustrated diagrammatically and includes a first distance sensing component 14 comprising a first light source 16 and an associated first light detector or receptor 18, and a second distance sensing component 20 comprising a second light source 22 and an associated second light detector or receptor 24. The emission/receptor unit 10 further preferably includes a processor 26 connected to each of the first and second light sources 16, 22 and connected to the first and second receptors 18, 24. The processor 26 controls power from a power source 28 to the light sources 16, 22 to control emission of individual light pulses from each of the first and second light source 16, 22. The processor 26 further operates with the first and second receptors 18, 24 to detect reception of reflected light from the component structure 12, where each receptor 18, 24 sends a signal to the processor 26 corresponding to each light pulse emitted from the light sources 16, 22 and received at the respective receptors 18, 24.

The first and second light sources 16, 22 preferably emit respective monochromatic light beams 30, 32, where the light beams 30, 32 preferably comprise predetermined different wavelengths selected within a range of infrared wavelengths. In particular, the first light source 16 may comprise a first laser emitting a monochromatic, coherent light beam 30 having a first predetermined wavelength, $\lambda_1$. Similarly, the second light source 22 may comprise a second laser emitting a monochromatic, coherent light beam 30 of a second predetermined wavelength, $\lambda_2$, different from the first wavelength, $\lambda_1$.

The first and second receptors 18, 24 may comprise any known detector for sensing the reflected light provided by the light beams 30, 32. The first receptor 18 preferably comprises a detector that is sensitive to the first wavelength, $\lambda_1$, and the second receptor 24 preferably comprises a detector that is sensitive to the second wavelength, $\lambda_2$, such that the first and second receptors 18, 24 are sensitive to detect the particular time of arrival of the respective reflected light beams 30, 32 at the emission/receptor unit 10. Further, the first and second receptors 18, 24 may selectively detect the first and second wavelengths, $\lambda_1$, $\lambda_2$, such that the transmission and detection of the light beams 30, 32 may be performed simultaneously.

Figure 3:
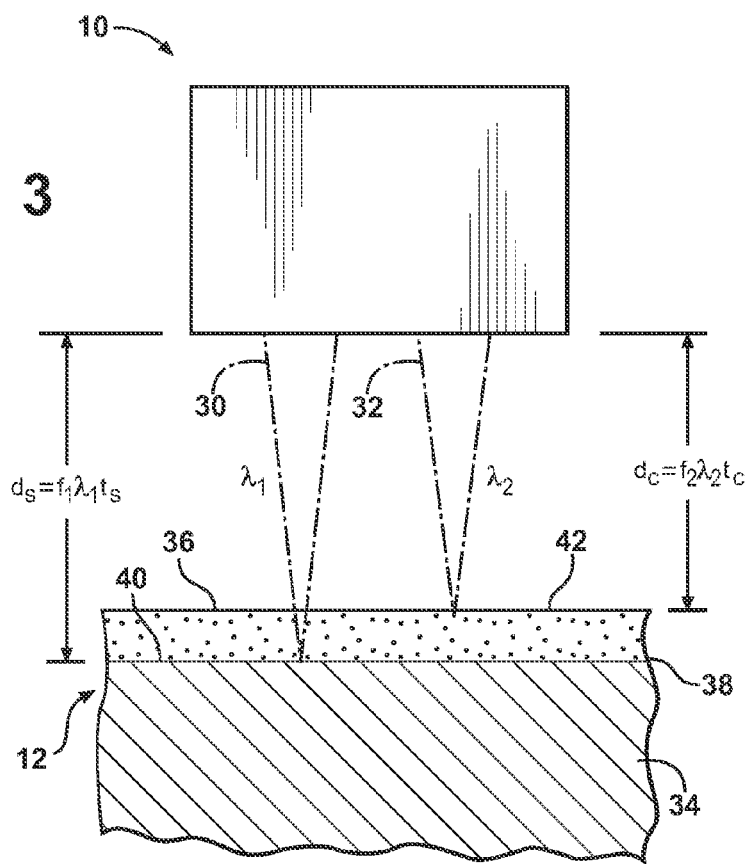
FIG. 3 is diagrammatic view illustrating measurement of distances traveled by two light beams emitted from the emission/receptor unit for obtaining a coating thickness measurement in accordance with the present invention.

Referring to FIGS. 2 and 3, the component structure 12 comprises a substrate material 34 having a coating 36 adhered thereto. In one embodiment, the substrate material 34 comprises a metal substrate, and the coating 36 comprises a thermal barrier coating, such as may be used in high temperature applications in gas turbine engines. With reference to a specific example of the described embodiment, the metal substrate material 34 may be a superalloy comprised substantially of nickel or cobalt, and the thermal barrier coating 36 may comprise 8 wt % yttria stabilized zirconia. In addition, a bond coat 38 may be provided at an interface 40 between the thermal barrier coating 36 and the metal substrate material 34. Such a bond coat 38 may comprise a nickel, cobalt or iron based metallic coating.

The wavelength of each of the light beams 30, 32 provided from the respective light sources 16, 22 is preferably selected with reference to the particular material of the substrate material 34 and the coating 36. Specifically, the first wavelength, $\lambda_1$, is selected to be substantially transmissive through the coating 36, and to be substantially non-transmissive through the substrate material 34. That is, the first wavelength, $\lambda_1$, is preferably selected as a relatively short infrared wavelength, such that the first light beam 30 may transmit through the coating 36 and will be reflected back at the location of the interface 40 between the coating 36 and the substrate material 34. The second wavelength, $\lambda_2$, is similarly selected such that it will not transmit through the coating 36. That is, the second wavelength, $\lambda_2$, is selected such that it is longer than the first wavelength, $\lambda_1$, and will reflect off an outer surface 42 of the coating 36. In above specific example of the described embodiment, the first wavelength, $\lambda_1$, may be approximately 4 μm to pass through the 8 wt % yttria stabilized zirconia thermal barrier coating defining the coating 36 and reflect from the location of the interface 40 with the metal substrate material 34, and the second wavelength, $\lambda_2$, may be equal to or greater than approximately 10 μm to reflect from the outer surface 42 of the thermal barrier coating defining the coating 36.

It should be noted that, without departing from the spirit and scope of the invention, the thermal barrier coating defining the coating 36 may comprise two or more layers of thermal barrier coating. Further, it should be understood that the thermal barrier coating materials, and associated wavelengths for measuring thickness, described herein are presented for illustrative purposes. Other thermal barrier coating chemistries and associated wavelengths for detecting thickness may be implemented within the scope of the present invention, including providing a different thermal barrier coating chemistry for each of a plurality of layers of thermal barrier coatings, where the first wavelength, $\lambda_1$, may be selected to pass through all of the plurality of layers of the coating 36 to the substrate material 34 and the second wavelength, $\lambda_2$, may be selected to reflect from an outer layer of the plurality of layers of the coating 36.

In an alternative embodiment of the substrate material 34 and coating 36, the substrate material 34 may comprise a ceramic and the coating 36 may comprise an environmental barrier coating. For example, the substrate material 34 may comprise a silica-based non-oxide ceramic and the environmental barrier coating may comprise a mullite, and a barium strontium aluminosilicate (BSAS) intermediate coat may also be provided. The first wavelength, $\lambda_1$, is selected as a relatively short infrared wavelength, i.e., 4 μm, to be substantially transmissive through the coating 36 defined by the environmental barrier coating, and to be substantially non-transmissive through the ceramic substrate material 34. The second wavelength, $\lambda_2$, is selected as a relatively longer infrared wavelength, i.e., equal to or greater than approximately 10 μm, such that it will not transmit through the environmental barrier coating defining the coating 36, i.e., the second wavelength, $\lambda_2$, will reflect off the environment barrier coating.

Referring to FIG. 3, an enlarged view of the substrate material 34 and coating 36 is shown to illustrate a method of calculating the coating thickness in accordance with an embodiment of the present invention. The thickness of the coating 36 is equal to the difference in the distance traveled by the light beams 30, 32, traveling from and returning to the emission/receptor unit 10. The distance, $d_s$ (m), traveled by the light beam 30 from the first light source 16 to the substrate material 34 and back to the first receptor 18 may be expressed as $d_s = f_1 \times \lambda_1 \times t_s$; where $f_1$ equals the frequency (Hz) of a pulse of light from the first light source 16, $\lambda_1$ equals the wavelength (m) of the first pulse of light, and $t_s$ equals the elapsed time (sec), i.e., time-of-flight, for the first pulse of light to travel from the first light source 16 and reflect back from the substrate material 34 and be detected at the first receptor 18. Similarly, the distance, $d_c$ (m), traveled by the light beam 32 from the second light source 22 to the coating 36 and back to the second receptor 24 may be expressed as $d_c = f_2 \times \lambda_2 \times t_c$; where $f_2$ equals the frequency (Hz) of a pulse of light from the second light source 22, $\lambda_2$ equals the wavelength (m) of the second pulse of light, and $t_c$ equals the elapsed time (sec), i.e., time-of-flight, for the second pulse of light to travel from the second light source 22 and reflect back from the outer surface 42 of the coating 36 and be detected at the second receptor 24. Hence, the thickness, T, of the coating 36 may expressed as $T = f_1 \lambda_1 t_s - f_2 \lambda_2 t_c$.

The light from the light sources 16, 18 is preferably provided as pulsed light to facilitate identification of a particular emitted light beam 30, 32, comprising a pulse having a clearly defined start and stop time, with a reflected pulse received at a respective receptor 18, 24. Further, a plurality of pulses of the light beams 30, 32 may be provided for a measurement at any given location, with the results of plural pulse measurements averaged to provide increased accuracy of the thickness measurement. The pulsed light beams 30, 32 may be emitted from the emission/receptor unit 10 either sequentially or simultaneously.

The first light source 16, first receptor 18, second light source 22 and second receptor 24 are mounted in fixed relation to each other within the emission/receptor unit 10, such that a change in spacing between the emission/receptor unit 10 and the component structure 12 will result in substantially equal changes the distance traveled by the two light beams 30, 32 to and from the component structure 12. That is, there will not be any substantial change in the differential of the time-of-flight between the two light beams 30, 32 with repositioning of the emission/receptor unit 10 relative to the component structure 12. The present arrangement is adapted to be positioned to a plurality of locations relative to the component structure 12 to provide a thickness measurement at each of the locations while avoiding the need to perform a calibration to obtain an accurate measurement of the coating thickness.

It should be noted that, while the emission/receptor unit 10 shown herein illustrates the two emitted light beams 30, 32 with a certain spacing therebetween, the light sources 16, 22 and respective receptors 18, 24 are preferably positioned in the emission/receptor unit 10 closely adjacent to each other, and/or may be aligned, such that time-of-flight readings may be obtained from the two light beams 30, 32 at substantially the same or closely adjacent locations on the component structure 12. Such a construction facilitates accurate inspection of the coating thickness at localized areas on the component structure 12. Further, the emission/receptor unit 10 may be constructed as a portable (handheld) unit to facilitate positioning the emission/receptor unit 10 adjacent to the component structure 12, as seen in FIG. 1, and to facilitate performance of the method at multiple locations along the component structure 12.

The present method may be incorporated into a process of coating the substrate material to ensure application of a desired thickness. For example, the method may be implemented during a thermal spray coating process, wherein an elevated temperature of the surface will not adversely affect the thickness measurement obtained from the pulsed light beams 30, 32.

Although the present method has been described with reference to a particular substrate material 34 and coating 36, it should be understood that the method may generally be used to measure a thickness of a layer of material located on a dissimilar base material, where the layer of material is substantially transparent to the wavelength of the first light beam 30 and is substantially opaque or reflective of the wavelength of the second light beam 32.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of measuring a thickness of a coating on a substrate material, the method comprising:

emitting a first pulse of monochromatic light having a predetermined first wavelength toward the coating and substrate material;

emitting a second pulse of monochromatic light having a predetermined second wavelength toward the coating and substrate material, the second wavelength being different than the first wavelength;

measuring a first elapsed time from emission of the first pulse of light to reception of a reflection of the first pulse of light from a surface of the substrate material at an interface with the coating;

measuring a second elapsed time from emission of the second pulse of light to reception of a reflection of the second pulse of light from an outer surface of the coating; and determining a thickness of the coating as a function of a difference between the first and second elapsed times.

2. The method of claim 1, wherein the first and second wavelengths comprise two different wavelengths of coherent infrared laser light.

3. The method of claim 1, wherein the first wavelength comprises a shorter wavelength than the second wavelength.

4. The method of claim 1, wherein the coating comprises a thermal barrier coating and the substrate material comprises a metal substrate, and the thermal barrier coating is transmissive to the first wavelength and is reflective of the second wavelength.

5. The method of claim 4, wherein the thermal barrier coating comprises 8 wt % yttria stabilized zirconia and the substrate material comprises a superalloy comprised substantially of nickel or cobalt.

6. The method of claim 5, wherein the first wavelength is approximately 4 μm and the second wavelength is equal to or greater than approximately 10 μm.

7. The method of claim 5, including a bond coat at the interface between the thermal barrier coating and the metal substrate, the bond coat comprising a nickel, cobalt or iron based metallic coating.

8. The method of claim 1, wherein the coating comprises an environment barrier coating and the substrate material comprises a ceramic substrate, and the environmental barrier coating is transmissive to the first wavelength and is reflective of the second wavelength.

9. The method of claim 1, wherein determining the thickness of the coating comprises determining a thickness, T, equal to:

$$T = f_1 \lambda_1 t_s - f_2 \lambda_2 t_c$$

where:
$f_1$ = frequency of the first pulse of light
$\lambda_1$ = wavelength of the first pulse of light
$t_s$ = elapsed time of the first pulse of light reflected from substrate
$f_2$ = frequency of the second pulse of light
$\lambda_2$ = wavelength of the second pulse of light
$t_c$ = elapsed time of the second pulse of light reflected from coating.

10. A method of measuring a thickness of a thermal barrier coating on a metal substrate, the method comprising:

emitting a first pulse of coherent light from a first laser toward the thermal barrier coating and the metal substrate, the first pulse of light having a predetermined first wavelength;

emitting a second pulse of coherent light from a second laser toward the thermal barrier coating and the metal substrate, the second pulse of light having a predetermined second wavelength different than the first wavelength;

measuring a first elapsed time from emission of the first pulse of light to reception of a reflection of the first pulse of light at a first detector from a surface of the metal substrate at an interface with the thermal barrier coating;

measuring a second elapsed time from emission of the second pulse of light to reception of a reflection of the second pulse of light at a second detector from an outer surface of the thermal barrier coating; and determining a thickness of the thermal barrier coating as a function of a difference between the first and second elapsed times.

11. The method of claim 10, wherein the first wavelength comprises a shorter wavelength than the second wavelength, and the thermal barrier coating is transmissive to the first wavelength and is reflective of the second wavelength.

12. The method of claim 11, wherein the first wavelength is approximately 4 μm and the second wavelength is equal to or greater than approximately 10 μm.

13. The method of claim 10, wherein the thermal barrier coating comprises 8 wt % yttria stabilized zirconia and the metal substrate comprises a superalloy comprised substantially of nickel or cobalt.

14. The method of claim 10, wherein determining the thickness of the thermal barrier coating comprises determining a thickness, T, equal to:

$$T = f_1 \lambda_1 t_s - f_2 \lambda_2 t_c$$

where:
$f_1$ = frequency of the first pulse of light
$\lambda_1$ = wavelength of the first pulse of light
$t_s$ = elapsed time of the first pulse of light reflected from substrate
$f_2$ = frequency of the second pulse of light
$\lambda_2$ = wavelength of the second pulse of light
$t_c$ = elapsed time of the second pulse of light reflected from coating.

15. The method of claim 10, wherein the first and second lasers and the first and second detectors are mounted in fixed relation to each other on an emission/receptor unit, and including moving the emission/receptor unit to different positions relative to the thermal barrier layer and metal substrate to obtain different thickness measurements at the different positions.

16. A method of measuring a thickness on a structure comprising a thermal barrier coating on a metal substrate, the method comprising:

providing a structure comprising a metal substrate comprised substantially of nickel or cobalt and a thermal barrier coating on the metal substrate comprising 8 wt % yttria stabilized zirconia;

emitting a first pulse of coherent light from a laser toward the thermal barrier coating and the metal substrate, the first pulse of light having a predetermined first wavelength and the thermal barrier being transmissive to the first wavelength;

emitting a second pulse of coherent light from a laser toward the thermal barrier coating and the metal substrate, the second pulse of light having a predetermined second wavelength different than the first wavelength and the thermal barrier coating being reflective of the second wavelength;

measuring a first elapsed time from emission of the first pulse of light to reception of a reflection of the first pulse of light from a surface of the metal substrate at an interface with the thermal barrier coating;

measuring a second elapsed time from emission of the second pulse of light to reception of a reflection of the second pulse of light from an outer surface of the thermal barrier coating; and determining a thickness of the thermal barrier coating as a function of a difference between the first and second elapsed times.

17. The method of claim 16, wherein the first wavelength comprises a shorter wavelength than the second wavelength, and the thermal barrier coating is transmissive to the first wavelength and is reflective of the second wavelength.

18. The method of claim 17, wherein the first wavelength is approximately 4 μm and the second wavelength is equal to or greater than approximately 10 μm.

19. The method of claim 16, wherein determining the thickness of the thermal barrier coating comprises determining a thickness, T, equal to:

$$T = f_1 \lambda_1 t_s - f_2 \lambda_2 t_c$$

where:
- $f_1$ = frequency of the first pulse of light
- $\lambda_1$ = wavelength of the first pulse of light
- $t_s$ = elapsed time of the first pulse of light reflected from substrate
- $f_2$ = frequency of the second pulse of light
- $\lambda_2$ = wavelength of the second pulse of light
- $t_c$ = elapsed time of the second pulse of light reflected from coating.

20. The method of claim 16, wherein the structure further includes a bond coat at the interface between the thermal barrier coating and the metal substrate, the bond coat comprising a nickel, cobalt or iron based metallic coating.

* * * * *